United States Patent [19]
Urban et al.

[11] 3,869,177
[45] Mar. 4, 1975

[54] PNEUMATIC ANTI-SKID CONTROL BRAKE SYSTEM WITH AN EMERGENCY BRAKE CONTROL VALVE

[75] Inventors: John A. Urban, Livonia; Gary L. Hopkins, Southfield; John Keith Armstrong, Livonia, all of Mich.

[73] Assignee: Eaton Corporation, Cleveland, Ohio

[22] Filed: Feb. 12, 1973

[21] Appl. No.: 354,631

Related U.S. Application Data
[62] Division of Ser. No. 192,438, Oct. 26, 1971, abandoned.

[52] U.S. Cl. ............ 303/21 F, 188/181 A, 303/7, 303/9, 303/40
[51] Int. Cl. ...... B60t 8/06, B60t 15/02, B60t 13/28
[58] Field of Search ......... 303/21 F, 21 AF, 61–63, 303/68–69, 13, 9, 7, 50, 40; 188/181 A, 170

[56] References Cited
UNITED STATES PATENTS

| | | | |
|---|---|---|---|
| 2,440,343 | 4/1948 | McCune | 303/21 F |
| 3,304,131 | 2/1967 | Bueler | 303/13 X |
| 3,393,018 | 7/1968 | Fites | 303/13 |
| 3,411,836 | 11/1968 | Dobrikin et al. | 303/40 |
| 3,456,991 | 7/1969 | Valentine et al. | 303/40 X |
| 3,512,552 | 5/1970 | Dobrikin et al. | 303/40 |
| 3,545,818 | 12/1970 | Davis | 303/21 F |
| 3,549,208 | 12/1970 | Cruse | 303/9 |

Primary Examiner—Trygve M. Blix
Assistant Examiner—D. C. Butler
Attorney, Agent, or Firm—Teagno & Toddy

[57] ABSTRACT

A brake control system for a towed vehicle which includes an emergency control valve operative in combination with an anti-skid system to provide emergency brake control in the event service pressure is lost. The emergency control valve senses a pressure level in the emergency line and supplies brake apply pressure from a reservoir on the towed vehicle when the emergency line pressure falls below a predetermined level. The valve is also usable with spring brakes such that the spring brakes provide a back-up parking brake without overriding the anti-skid control during emergency operation.

4 Claims, 3 Drawing Figures

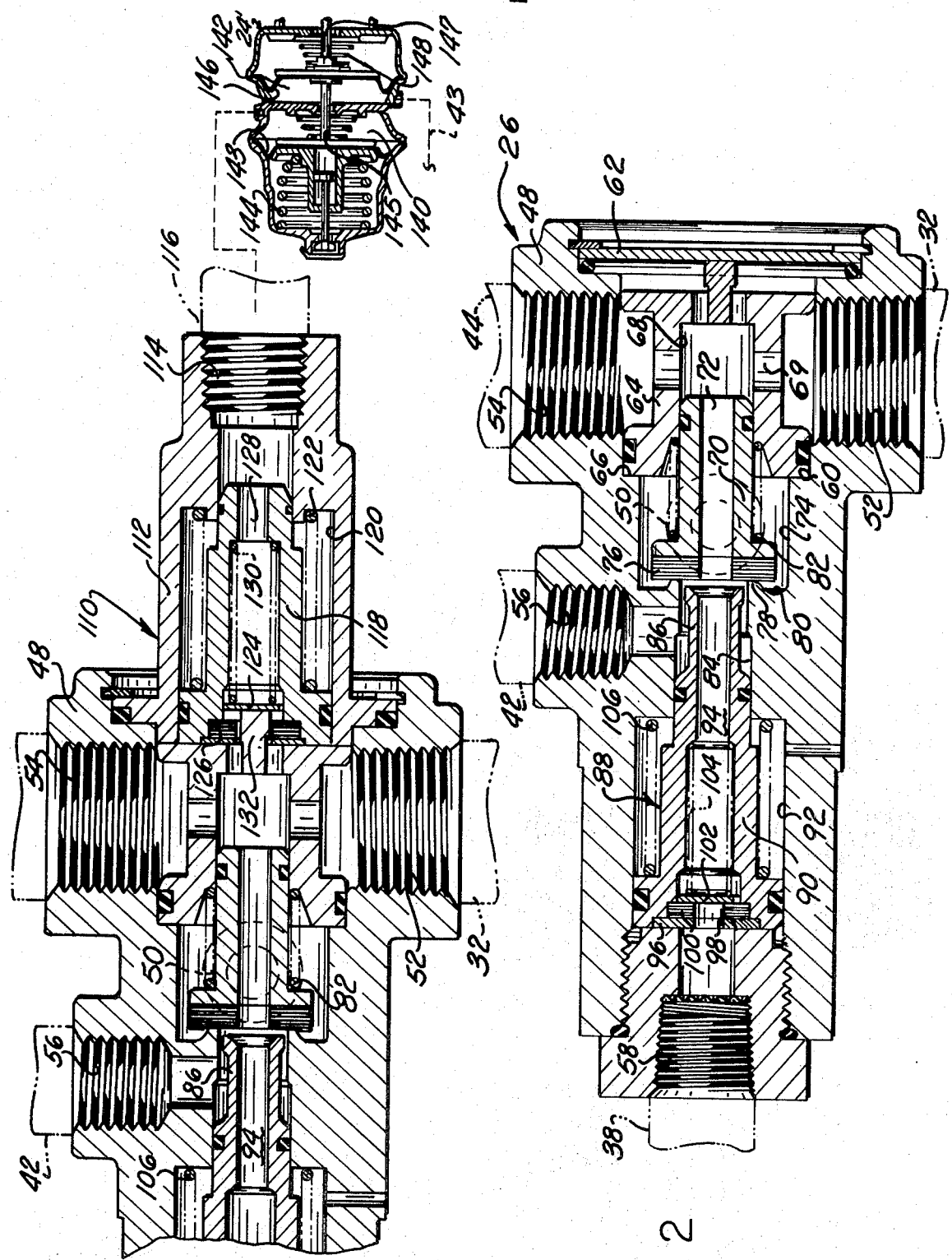

3,869,177

A PNEUMATIC ANTI-SKID CONTROL BRAKE SYSTEM WITH AN EMERGENCY BRAKE CONTROL VALVE

This is a division of application Ser. No. 192,438 filed Oct. 26, 1971, and now abandoned.

This invention relates to a brake control system and more particularly to a control valve and system for use in controlling application of the brakes on a towed vehicle.

It is an object of this invention to provide a brake control system for a towed vehicle in a rig such as a tractor-trailer unit equipped with air brakes and in which the brake control system includes an emergency control valve which it operative to sense the air pressure in the emergency line between the tractor and the towed vehicle and is operative to apply the brakes of the towed vehicle whenever the air pressure in that line falls below a predetermined level.

Still a further object of this invention is to provide a pneumatic emergency control system which can be used in combination both with an anti-skid system and with spring brakes, with the system being operative to provide antiskid control during emergency application of the brakes and with the spring brakes providing a back-up parking brake without overriding the anti-skid control during emergency operation.

Still another object of the invention is to provide an air operated brake system in combination with spring brakes and in which during emergency operation of the brakes the combined pneumatic brake applying pressure and the spring brake apply pressure are coordinated to provide a generally constant braking torque.

In accordance with one aspect of this invention, there is provided a brake control system for controlling the application of fluid operated brakes wherein the system includes a source of fluid pressure; value means for controlling flow of pressure to the brakes; operator controlled means for controlling the flow of fluid pressure to the valve means and an emergency control valve connected to said source of fluid pressure, said valve means and said operator control means; a reservoir connected to said emergency control valve means; said emergency control valve means including a first valve member for selectively communicating the reservoir means with the source of fluid pressure and a second valve member for selectively interconnecting said valve means with said operator controlled means and said reservoir means; said second valve member being operative to connect said valve means with said operator controlled means when the pressure source is above a predetermined level and to connect said valve means with said reservoir means when the pressure from said source is below a predetermined level.

A further object of the invention is the provision of an emergency control valve of the above-described type, which is readily adapted for use with spring applied brakes by the addition of a spring brake adapter cartridge which cartridge includes a check valve operative to communicate reservoir pressure to the spring brakes and apply a hold-off pressure when the brake system is pressurized and which is further operative upon loss of system pressure to vent the hold-off pressure thereby allowing the springs or other suitable mechanical means automatically to apply the brakes.

Still a further aspect of the invention is an emergency brake control system which utilizes the above described emergency control valve in combination with spring applied brakes and an anti-skid control, and wherein the anti-skid control is operative during emergency application of the brakes and the spring applied brakes gradually become effective without overriding the skid control operation.

Other aspects, objects and features of the invention will be more apparent upon a complete reading of the following description which, together with the attached drawings, discloses but a preferred form of the invention.

Referring now to the drawings wherein like reference numerals indicate like parts in the various views:

FIG. 2 is a longitudinal sectional view through the emergency control valve.

FIG. 3 is a partial longitudinal sectional view of FIG. 2 modified by the addition of a spring brake adapter cartridge.

Figure 1:
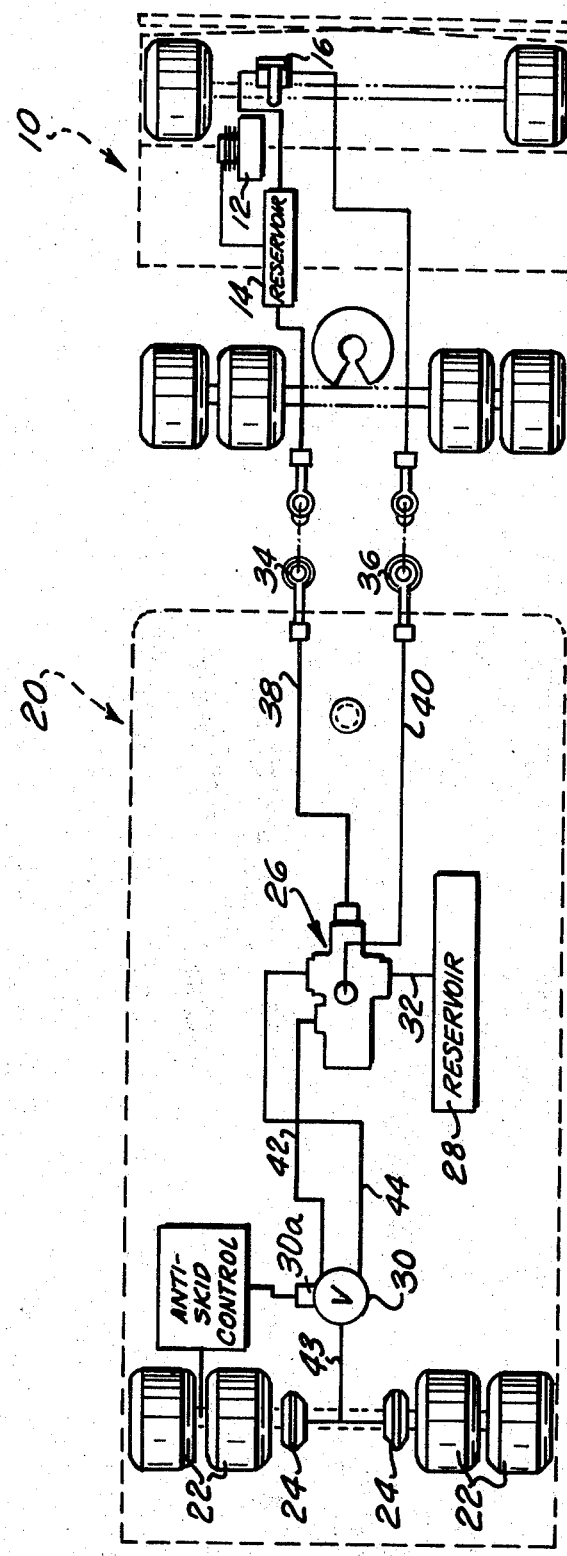
FIG. 1 is a schematical illustration of a tractor-trailer unit equipped with the brake control system and emergency control valve to the instant invention.

Referring to FIG. 1, there is schematically illustrated a tractor-trailer arrangement in which the valve and brake system of this invention may be employed. As illustrated, a tractor indicated generally by the reference numeral 10 includes a conventional source of pneumatic pressure as shown by the compressor 12. The compressor 12 is connected to a supply reservoir 14. In addition, the tractor includes a conventional manually operated treadle valve 10 which is connected to the reservoir 14.

Also schematically depicted in FIG. 1 is a conventional trailer unit indicated generally by the reference numeral 20 and which is adapted to be connected to the tractor 10. The trailer includes conventional brakes, not shown, associated with the wheels 22 with the brakes being adapted to be actuated by conventional brake actuators 24. The trailer also includes a pneumatic system for actuating the brakes, which system includes a control valve 26, an emergency supply reservoir 28, and a relay valve 30. The relay valve 30 is preferably of the construction shown in copending application Ser. No. 125,280 filed Mar. 17, 1971, (now continuation application Ser. No. 458,608) assigned to the assignee herein, and is intended to cooperate with a suitable skid control circuit, generally indicated at 31, to provide a skid control function.

The relay valve in the copending application is generically of the pilot air operated type which intercommunicates the valve supply port and service port in response to an air pressure in a pilot chamber acting on a diaphragm or piston. The relay valve in the copending application also includes a pressure compensating feature and a pilot chamber vent feature. The pressure compensating feature varies the rate of pressure rise at the service port. The pressure compensating feature is desirable in a brake control system such as disclosed herein; however, the feature forms no part of the invention herein and requires no further mention. The pilot chamber vent feature is accomplished by a solenoid operator valve 30a which blocks the inlet passage to the pilot chamber and vents the pilot chamber in response to an electrical signal from the skid control circuit 31.

The reservoir 28 is connected to the valve 26 by a reservoir line 32. The valve 26, in turn, is connected to an emergency line 38 and a service line 40. Suitable gladhand connectors 34, 36 connect service line 40 to the treadle valve 16 and emergency line 38 to the tractor reservoir 14. An application line 42 connects the valve 26 with the pilot portion of the relay valve 30 while a supply line 44 connects valve 26 and the service portion of the relay valve 30. Line 43 connects valve 30 with the actuators 24.

The above-described system functions to supply pneumatic pressure to the relay wire 30 under control of the manually operated treadle valve 16 during normal operation of the brake system. In addition, the system contemplates that the relay valve 30 will provide a skid control function in the manner described in the afore-mentioned copending application in the event a skid condition is encountered by the tractor-trailer unit. The valve 26, and the disclosed system in which it is incorporated, are intended automatically to apply the brakes when the supply lines between the tractor and the trailer are either severed or otherwise inadvertently disconnected or when the towed vehicle is parked and the tractor disconnected.

Turning now to FIG. 2, one form which the emergency control valve 26 may take is illustrated. The valve 26 comprises a valve housing 48 having five ports: a service port 50, a reservoir port 52, a supply port 54, an application port 56, and an emergency port 58. The valve chambers internal of the housing 48 comprise a plurality of co-axial counterbored portions which include a first chamber 60 in communication with ports 52, 54. An appropriate closure 62 closes one end of that chamber. A bobbin 64 is received in the chamber 60 with one end of the bobbin abutting a radial shoulder 66. The bobbin 64 has a longitudinal internal passage or bore 68 with radial passage 69 providing communication between the exterior of the bobbin and the bore 68.

Slidably received in the bore 68 is a spool assembly 70 in which a longitudinal fluid passage 72 is formed. The other end of the spool assebly extends into a chamber 74. An appropriate seal 76 is carried on one end of the spool 70 and is adapted to sealingly engage an annular lip 78 formed on a radial shoulder 80. A seal spring 82 biases the spool assembly 70 to a position where it normally is in engagement with the annular lip 78. The service port 50 is in fluid communication with the chamber 74.

The application port 56 communicates with a third chamber 84. Extending into the chamber 84 is a nose portion 86 of a check valve spool assembly 88 which includes a spool portion 90 slidably received in a chamber 92. A passage 94 extends through the check valve spool assembly. A primary seal 96 is carried on one end of spool portion 90 and is adapted to abut shoulder 98. A check seal 100 also carried by spool portion 90 is adapted to be engaged by a check valve plate 102 in passage 94. The check valve plate 102 is biased by a check valve spring 104 to a position where the plate engages the seal 100 and closes the opening through the two seals 96, 100. A primary spring 106 acts to bias the check valve spool assembly 88 to the left as viewed in FIG. 2 whereby the seal 95 engages the shoulder 98 and the nose portion 86 is axially spaced from the seal 76 on the spool assembly 70.

The described valve 26 and control system operate in the following manner. With the gladhand connectors 34, 36 connected and before the vehicle is started, the condition of the valve is as shown in FIG. 2. Upon starting the engine, the compressor 12 builds up air pressure in the reservoir 14 to a pre-set level. This air pressure is transmitted via emergency line 38 to the emergency port 58. The air pressure at the emergency port 58 acts against the check valve plate 102 to displace that plate away from the seal 100 against the bias of spring 104 thereby allowing the air to flow around the plate, through the passage 94, through passage 72 into bore 68 and then through the radial passages 69 into the reservoir 28. The supply port 54, which is also connected by radial passages 69 to the chamber 68, is also exposed to the incoming air pressure. Similarly, the application port 56 is communicated to the incoming air pressure by the radial clearance between the periphery of the nose portion 86 and the walls of chamber 84. The spring constant of primary spring 106 is selected such that as long as the air pressure entering the emergency port 58 is less than a selected value, as for example, 60 psi, the check valve spool assembly 88 remains in the position shown in FIG. 2. However, as the air pressure builds up to a predetermined value governed by the spring 106, the check valve spool assembly 88 shifts to the right compressing the spring 106 and seating the end of the nose portion 88 against the seal 76.

The air pressure acting on the check valve spool assembly 88, which is now in engagement with spool assembly 70, also causes an axial shifting of that assembly. In this condition of the valve, the seated engagement of the nose portion 86 against the seal 76 on the adjacent end of the spool assembly 70 isolates the application port 56 from the air pressure in the emergency line 38. However, due to the shifting movement of the spool assembly 70, the application port 56 is placed to communication with the service port 50. The valve is now in a normal braking mode in which the air pressure delivered to the application port 56 and, hence, to the pilot operator of the relay valve 30, is under the direct control of the operator actuated treadle valve 16 so that the operator can control, through operation of the treadle valve 16, the degree to which the trailer brakes are applied.

The pressure in reservoir 28 continues to rise to compressor-governed pressure by flow from the emergency line 38 through the check valve plate 102. Upon stabilization of the compressor pressure, the check valve plate 102 will close under the bias of spring 104.

During normal braking of the vehicle, operation of treadle valve 16 will communicate pressure from reservoir 14 via service port 50 and application port 56 to the pilot portion of relay valve 30. The pressure will, in the manner described in the above-mentioned application, actuate the valve 30 to admit brake-apply pressure to actuators 24. This brake-apply pressure originates in reservoir 28 and is transmitted to valve 30 by conduits 32 and 44. It will be appreciated that, in the event any pressure imbalance is created across check valve 102 by reason of the application of the brakes, the check valve will open and additional air pressure will be admitted to bring reservoir 28 back up to the compressor-governed pressure.

If, during normal braking, a skid condition occurs, the skid control circuit 31 will be operative to generate a signal which will energize a solenoid associated with valve 30 to relieve the pilot pressure and relieve the brakes, as described in the copending application. When the skid condition has been corrected, the valve 30 returns to a normal relay operation.

In the event the pressure in the emergency line 38 should drop for any reason, as for example, where the emergency line is disconnected after the trailer is parked, the pressure in the emergency line which has maintained the check valve spool assembly 88 shifted to the right disappears enabling the primary spring 106 to move the check valve spool assembly to the left as viewed in FIG. 2. This movement of the check valve assembly also results in axial shifting of the spool assembly 70 back to the position shown in FIG. 2 in which the service port 50 is isolated from the application port 56. Thereafter, the nose portion 86 of the check valve spool assembly moves away from the seal 76 on the spool assembly, thereby placing the application port 56 in fluid communication through chamber 84, passage 72, and passages 69 with the full pressure in the reservoir 28. The communication of reservoir pressure to the pilot-operated portion of the relay valve 30 actuates the valve to supply full brake-apply pressure to the brakes of the trailer.

The same sequence of operation will occur to apply the brakes in the event the emergency line is inadvertently disconnected while the tractor-trailer unit is in operation. However, locking of the trailer wheels due to the abrupt application of full reservoir pressure is avoided by the presence of the valve 30 which, in combination with the skid control system, is effective to apply and release the brakes in a manner fully described in the aforementioned pending application.

The same basis system shown in FIG. 1 can be used with spring applied brakes by the addition of a spring brake adapter cartridge, indicated generally by the reference numeral 110, to the control valve 26. The valve with the spring brake adapter is used with a brake actuator of the type in which a spring or other mechanical means is normally operative to apply the brakes with fluid pressure being used to overcome the spring bias and hold the brakes released. One form of a spring brake actuator 24' is schematically illustrated in FIG. 3.

The cartridge 110 comprises a cartridge housing 112, one end of which is connected to the valve housing 48 in place of the closure plate 62. The other end of the cartridge housing 112 defines a port 114 connected to a line 116 which is, in turn, connected to the brake hold-off pressure chamber of the brake actuator 24'. The cartridge housing 112 further includes a check valve spool assembly 118 which is slidably received in a bore 120. A spring 122 normally biases the check valve assembly to the left is viewed in FIG. 3. A check valve plate 124 is adapted to cooperate with a check valve seal 126 to control the flow of fluid through an internal passage 128 in the spool assembly. A check valve spring 130 biases the plate 124 towards the seal 126; however, a projection 132 on bobbin 64 is positioned to engage plate 124 and maintain the plate out of sealing engagement with seal 126 when the valve is in the condition shown in FIG. 3.

The spring brake actuator 24' schematically illustrated in FIG. 3 comprises a pair of pressure chambers, a brake hold-off pressure chamber 140 and a service or brake applying chamber 142. A brake apply spring 144 normally acts on one side of a diaphragm 143 to bias a piston 145 and a second diaphragm 146 to the right as viewed in FIG. 3. A brake apply rod 147 is biased by a suitable spring 148 into engagement with the diaphragm 146. As the diaphragm 146 is shifted to the right under the bias of spring 144, the rod 147 is also shifted to the right to apply the brakes in a known manner.

The operation of the valve with the spring adapter 110 and the brake actuator 24' will now be described. Assuming the unit is at rest and no pressure in the system, the operative portions of the valve and the brake actuator are as illustrated in FIG. 3. Upon starting the vehicle and actuating the compressor 12, pressure in emergency line 38 is communicated through passage 128 and hold-off line 116 to the spring hold-off chamber 140 of the brake actuator 24'. The pressure in brake hold-off chamber 140 ultimately reaches a level at which it is effective to bias the diaphragm 143 to the left and compress the spring 144 thereby permitting the spring 148 to bias the diaphragm 146 and the rod 147 to the left. This action thereby releases the brakes of the vehicle. As the pressure in the system reaches a level sufficient to overcome the bias of spring 122, the check valve spool assembly 118 is shifted to the right and, as the system pressure stabilizes, the check valve 124 will close. It will be appreciated, of course, that the functioning of the other portions of the valve are as previously described.

During operation of the vehicle, actuation of the treadle valve 16 by the operator is effective to introduce fluid pressure through line 43 to the brake apply chamber 142. The fluid pressure in this chamber acts against the diaphragm 146 to overcome the bias of spring 148 and shift the rod 147 to actuate the brakes. At the same time, the brake hold-off pressure is maintained in chamber 140 so that the actuation of the brakes is solely under the control of the operator. If, during the braking cycle a skid condition is encountered, the skid control circuit 31 and the valve 30 will be effective to control the brake pressure applied to the brake apply chamber 142.

If for any reason the pressure in the emergency line 36 should decrease to a level which permits the check valve spool assembly 88 to move to the left, reservoir pressure will then be communicated to the pilot portion of relay valve 30 to apply the brakes in the same manner as described previously. However, it should be noted that with the application of reservoir pressure, the spring hold-off chamber 140 remains pressurized until the reservoir pressure decreases to a predetermined level. Thereafter, further drop in reservoir pressure below a predetermined level will result in the check valve spool assembly 118 shifting to the left causing the check valve plate 124 to engage the projection 132 and permitting pressure in the hold-off chamber 140 to begin to decrease. As the pressure in chamber 140 decreases, the spring 144 becomes increasingly effective to exert a brake applying force to rod 147. Thus, as the reservoir pressure decreases and, therefore, the apply pressure in chamber 142 decreases, the brake applying force exerted by spring 144 increases with the result that a generally constant brake torque is produced.

This latter aspect of the interaction between the control valve and the spring brake actuator may be illustrated by the following example. Assuming a reservoir pressure of 100 psi, the brake hold-off chamber 140 will also be pressurized to that level. If the trailer is being parked and the emergency line 38 is disconnected, the spring 106 will become effective to shift the check valve spool assembly 88 to the left and communicate full reservoir pressure to the pilot operator of the valve 30 which, in turn, will communicate full reservoir pressure to the brake apply chamber 142 to apply the brakes. In this parked condition, it will be noted that the brakes on the trailer are applied by the fluid pressure in the system. The drop in reservoir pressure resulting from application of the brakes is not sufficient to permit the spring 122 to move the check valve spool assembly 118 to the left so that the pressure in the brake hold-off chamber 140 is maintained at 100 psi. However, if while the vehicle is parked, the pressure in the system should decrease, the spring 144 is always available as a back-up to provide a brake apply pressure.

If, while the vehicle is in operation, the emergency line pressure drops below a predetermined level such as 60 psi, reservoir pressure will be communicated to the pilot operator and the brakes will be applied as previously described. If the brakes are applied without a skid being encountered, reservoir pressure will decrease only a small amount and the brake hold-off chamber 140 will remain pressurized to 100 psi. However, if a skid condition due to the application of full reservoir pressure is encountered, the valve 30 will be cycled to alternately vent the brake apply chamber 142 and reapply pressure to that chamber. The cycling of the valve 30 will cause the reservoir pressure to decrease. As the reservoir pressure drops to, for example, 50 psi, the pressure opposing spring 122 will be just sufficient to maintain assembly 118 shifted to the left. Any further decrease in reservoir pressure results in assembly 118 shifting under the bias of spring 122 opening check valve 124 and permitting the pressure in chamber 140 to begin to drop. As reservoir pressure drops from 50 to 40 psi the spring hold-off brake pressure may, for example, drop to 60 psi which is just sufficient to maintain the spring 144 compressed. As reservoir pressure continues to drop from 40 psi to 35 psi, the spring brake pressure may drop from 60 psi to 35 psi, thereby, enabling the spring 144 to become effective to apply a brake pressure which complements the brake pressure being applied by the decreasing reservoir pressure. As the reservoir pressure continues to decline, the pressure in chamber 140 will decrease correspondingly so that as the brake apply pressure exerted by the fluid decreases the brake apply force exerted by the spring 144 correspondingly increases to produce a generally constant brake torque.

It is to be understood that the foregoing example of pressure relationships are merely exemplary and that different pressure relationships may be utilized depending on the specific brake system.

While the invention has been described with reference to a preferred embodiment, neither the illustrated embodiment nor the terminology employed in describing it is intended to be limiting rather, it is intended to be limited only by the scope of the appended claims.

What is claimed is:

1. A brake control system for controlling the application of fluid operated brakes of a wheeled vehicle, said system comprising:

A. a fluid operated brake actuator for applying the brakes of a wheel;
B. a relay valve for controlling the application of fluid pressure to said brake actuator, said relay valve including
  1. a service port in communication with said brake actuator,
  2. a supply port,
  3. a pilot portion for communicating said supply port with said service port in response to a fluid pressure, and
  4. operator means for venting said pilot portion;
C. a first source of fluid pressure;
D. a second operator controlled source of fluid pressure;
E. reservoir means connected with said first source and said supply port;
F. control valve means connected to said reservoir means, said first source, said operator controlled source, and said pilot portion, said control valve means including
  1. means for selectively communicating said pilot portion with said operator controlled source of fluid pressure when the pressure from said first source is above a predetermined level, whereby normal braking of said wheel is provided by communicating said supply port with said service port in response to a fluid pressure from said operator controlled source of fluid pressure, and
  2. means for selectively communicating said pilot portion with said reservoir means when the pressure from said first source is below a predetermined level, whereby said emergency braking of said wheel is provided by communicating said supply port with said service port in response to the fluid pressure from said first source falling below said predetermined level;
G. skid control means for detecting a skid at the braked wheel and generating a skid signal; and
H. circuit means connecting said operator meand and skid means for actuating said operator means to vent said pilot portion when a skid signal is generated, thereby providing skid control of said braked wheel during normal and emergency braking.

2. The system of claim 1 wherein said brake actuator includes means normally operative to apply the brakes, said control valve means further including hold-off means for communicating fluid pressure to said brake actuator to render said normally operative means ineffective to apply the brakes.

3. The system of claim 2 wherein said hold-off means includes pressure responsive means operative to maintain said normally operative means ineffective only when the pressure in said reservoir means is above a predetermined level.

4. The system of claim 2 wherein said normally operative means becomes increasingly effective to apply the brakes as the pressure in said reservoir means progressively decreases below said predetermined level.

* * * * *

UNITED STATES PATENT OFFICE
CERTIFICATE OF CORRECTION

PATENT NO. : 3,869,177
DATED : March 4, 1975
INVENTOR(S) : John A. Urban; Gary L. Hopkins; John K. Armstrong It is certified that error appears in the above-identified patent and that said Letters Patent are hereby corrected as shown below:

| | |
|---|---|
| Col. 1, line 14: | "it" should read---is---. |
| line 36: | "value" should read---valve---. |
| line 54: | "object" should read---aspect---. |
| Col. 2, line 15: | "to" should read---of---. |
| line 18: | After "of" insert---the valve of---. |
| Col. 3, line 7: | "wire" should read---valve---. |
| line 32: | Before "69" the word should properly read---passages---. |
| line 37: | "assebly" should read---assembly---. |
| line 59: | "95" should read---96---. |
| Col. 4, line 22: | "88" should read---86---. |
| line 35: | Delete second occurrence of "the". |
| line 48: | "The" should read "This". |
| Col. 5, line 6: | After "valve" insert---spool---. |
| line 28: | "basis" should read---basic---. |
| Col. 6, line 20: | After "valve" insert---plate---. |
| line 38: | "36" should read---38---. |
| Col. 8, line 40: | "meand" should read---means---. |

Signed and Sealed this twenty-sixth Day of August 1975

[SEAL]

Attest:

RUTH C. MASON
Attesting Officer

C. MARSHALL DANN
Commissioner of Patents and Trademarks